Jan. 12, 1971  C. R. PORTER ETAL  3,553,967
HYDRAULIC CONTROL ASSEMBLY
Filed Aug. 1, 1969  2 Sheets-Sheet 1
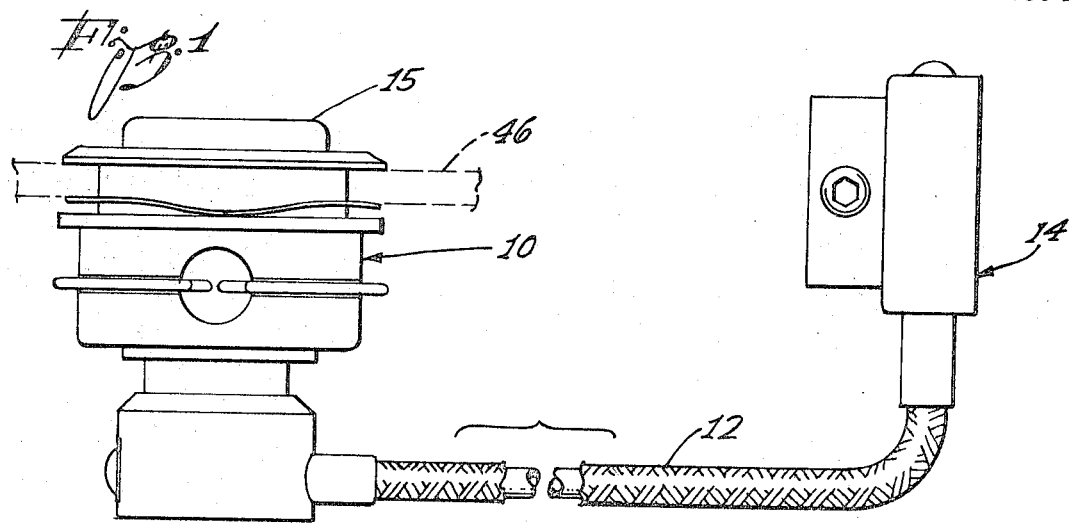
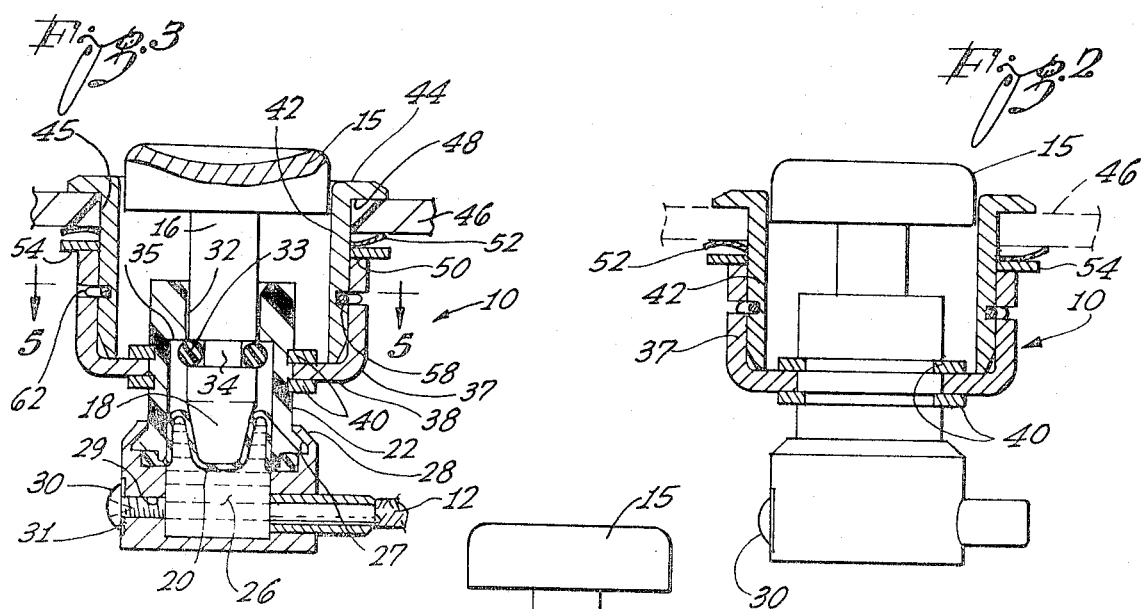
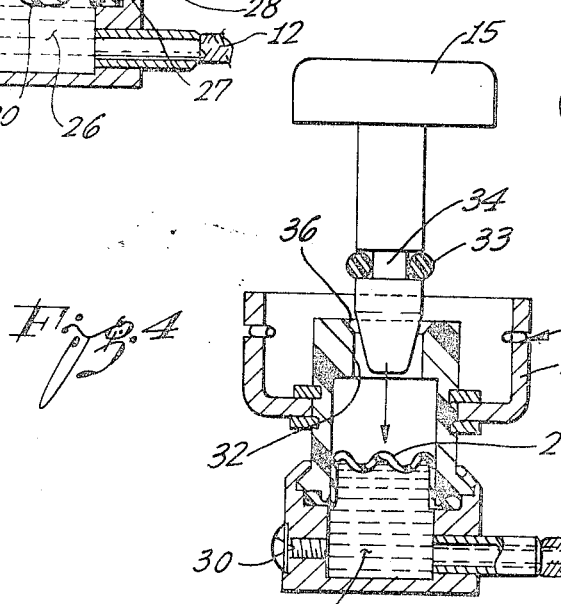
INVENTORS:
Joseph A. Sember
Clyde R. Porter
ATTORNEYS

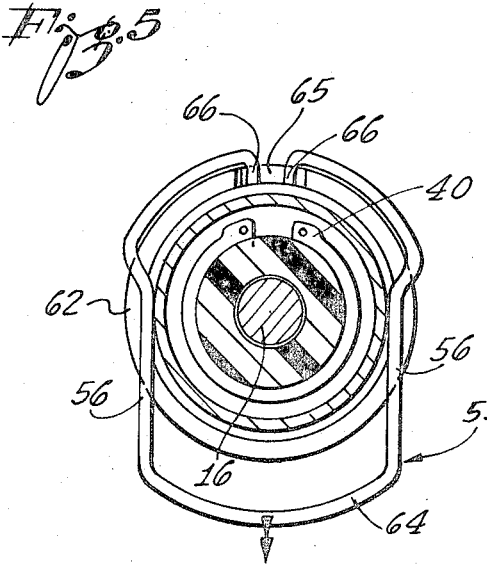
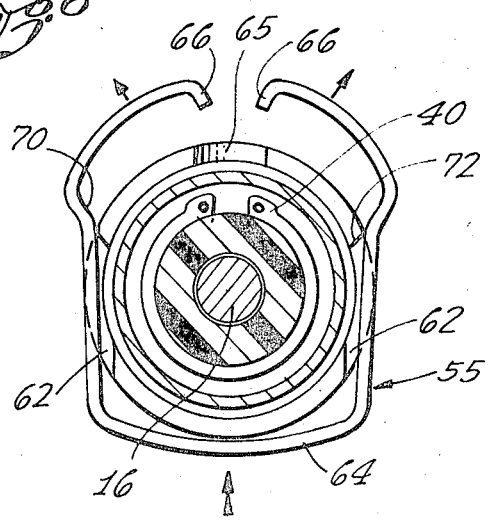
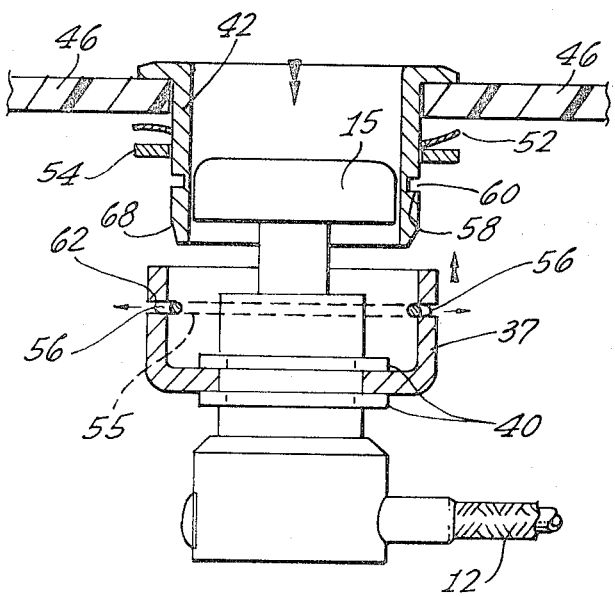
INVENTORS:
Joseph A. Sember
Clyde R. Porter
ATTORNEYS

United States Patent Office 3,553,967
Patented Jan. 12, 1971

3,553,967
HYDRAULIC CONTROL ASSEMBLY
Clyde Robert Porter, Los Angeles, and Joseph Alexander Sember, Glendale, Calif., assignors to P. L. Porter Co., Los Angeles, Calif., a corporation of California
Filed Aug. 1, 1969, Ser. No. 846,781
Int. Cl. F15b 7/00; G12b 9/00; G05g 5/06; H01h 15/18
U.S. Cl. 60—54.5
13 Claims

ABSTRACT OF THE DISCLOSURE

A plunger of a control unit displaces a movable wall for corresponding hydraulic displacement of a movable wall of a remote operating unit. The control unit itself is designed for assembly by snap action and is also constructed for mounting on the control panel by snap action.

BACKGROUND OF THE INVENTION

The invention relates to a remote control mechanism of the general type disclosed in Porter Pat. 3,173,263 which disclosure is hereby incorporated into the present disclosure by reference.

Such a remot control mechanism comprises a control unit and a remote operating unit which are operatively interconnected by a flexible tube containing hydraulic fluid. At the control unit a manually operable plunger acting on a movable wall displaces the hydraulic fluid for corresponding actuation of a movable wall of the remote operating unit, the remote movable wall being connected to whatever the remote control mechanism is designed to operate. As set forth in the above mentioned prior Porter patent, the invention has special utility for controlling a hydraulic lock for a inclinable back rest of a passenger seat of an airplane. Normally the back rest is in a forward upright position but if the occupant of the seat desires to tilt the back rest rearwardly to some selected angle, the operator merely manipulates a control member such as a push-button on the arm of the chair and then leans back against the back rest to tilt the back rest. The hydraulic lock that releasably holds the back rest at any selected angle of inclination comprises a cylinder and a piston dividing the cylinder into two hydraulic locking chambers, a normally closed locking valve controlling flow between the two locking chambers.

One of the problems to which the invention is directed is to design a push-button control unit that may be fabricated and assembled in an economical manner.

A second problem is to so construct such a hydraulic control mechanism as to simplify the introduction into the control unit of a precisely correct volume of hydraulic fluid.

Still another problem to which the invention is directed is to simplify the procedure of installing the hydraulic control mechanism in an airplane seat. This problem presents difficulties because limited space is available for the hydraulic control mechanism and because the hydraulic tube of the mechanism must be snaked through the arm of the seat structure for connection to the hydraulic lock. The installation problem is further complicated because the push-button control unit must be mounted on a control panel on the arm of the airplane seat and conventional methods of mounting such a control unit involves too much time and labor. In many instances moreover, screws or other fastening elements are undesirably exposed to detract from the appearance of the installation.

SUMMARY OF THE INVENTION

The push-button control unit is a hollow body with its interior spanned by a diaphragm which constitutes the movable wall of a hydraulic chamber. The push-button is in the form of a plunger which extends into the hollow body into contact with the diaphragm. At the remote operating chamber, a second diaphragm or other form of movable wall is normally retracted by spring means in the form of Belleville springs and, in effect, the communicating column of hydraulic liquid is accordingly retracted to hold the diaphragm in the control unit snugly against the nose of the push-button plunger.

Normally the push-button plunger is in a retracted position at which stop means on the plunger cooperates with stop means in the hollow body to limit the retraction movement of the plunger. When the push-button is depressed to advance the plunger, the plunger advances the hydraulic liquid in opposition to the remote Belleville springs and thus causes the remote movable wall to execute an operating stroke for opening the normally closed valve of the hydraulic lock that is operatively connected to the tiltable back rest.

One feature of the invention is that the fabrication of the push-button control unit is simplified by clamping the margins of the diaphragms between two portions of the hollow body of the control unit, the two portions then being permanently secured together by a simple swaging operation.

A further feature of the construction of the push-button control unit is the concept of slidingly mounting the push-button plunger in a port of the hollow control body and equipping the push-button plunger with an O-ring in a circumferential groove of the plunger to serve as stop means at the normal retracted position of the plunger. The entrance to the port that slidingly embraces the push-button plunger is chamfered and the O-ring together with the circumferntial groove in which it is seated are so designed that the O-ring may be distorted to pass through the port in the hollow body. By virtue of this arrangement the procedure of assembling the push-button plunger to the control unit consists simply in placing the circumscribing O-ring on the push-button plunger then forcibly inserting the push-button plunger through the port until the O-ring clears the port. When the O-ring clears the port it expands radially to its normally unrestrained diameter at which it cooprates with the port as stop means at the retracted position of the plunger.

The push-button control unit is provided with a fill opening for the hydraulic fluid and after a predetermined quantity of fluid is introduced through the fill port with care to avoid trapping air, the fill port is permanently closed. The control unit is then ready for the above described insertion of the push-button plunger.

The problem of simplifying the installation of the push-button control unit on the control panel of the airplane seat is solved by making the hollow body of the control unit in two sections that telescope together. The inner of the two telescoping sections is dimensioned to fit snugly in a circular hole in the panel and is provided at its forward end with a rearwardly facing peripheral shoulder for cooperation with the front face of the panel. The outer of the two telescoping body sections has a forwardly facing peripheral shoulder to cooperate with the rear face of the panel. Thus telescoping the two hollow body sections together results in the panel being gripped between the two peripheral shoulders.

An important feature of the invention is the provision of a spring wire latch to releasably lock the two hollow body sections together at their assembled positions, the latch being manually releasable and being constructed to lock the two telescoping hollow body sections together with a snap action. Thus the procedure of mounting the push-button control unit on the panel consists essentially of inserting the inner of the two hollow body sections in the panel opening from the front of the panel and then telescoping the outer section over the inner section from the rear side of the panel.

In the preferred practice of the invention, a marcel spring and a cooperating back-up ring are provided to place the panel under compression between the two peripheral shoulders and thus make the mounted push-button control unit rigid relative to the panel. The marcel spring and the back-up ring are telescoped over the inner body section after the inner body section is inserted into the panel opening and before the outer body section is telescoped over the inner body section. Thus the marcel spring is concealed behind the panel with the rearwardly facing peripheral shoulder of the inner body section lying snugly and neatly against the front face of the panel.

The spring means for interlocking the two telescoped body sections is a spring wire with two arms that straddle the outer body section and normally engage a third forwardly facing peripheral shoulder of the inner body section to lock the two body sections together.

In the preferred embodiment of the invention the third forwardly facing peripheral shoulder is provided by forming an outer circumferential groove in the inner of the two telescoping body sections and the outer telescoping body section is provided with diametrically opposite circumferentially extending slots into which the two spring arms extend for releasable engagement with the outer circumferential groove of the inner telescoping body section. The two spring arms are biased inwardly towards their locking positions and the inner telescoping body section is chamfered to wedge the two arms outwardly. Thus the spring arms respond to progressive telescoping of the two body sections together by first spreading out of their locking positions and then snaping into their locking positions when the circumferential groove of the inner section registers with the spring arms.

A further feature of the invention is the concept of providing a cam action for shifting the two spring arms outwardly to their release positions whenever it is desired to remove the push-button control unit from the panel. For this purpose the portion of the wire spring that interconnects the two arms is bowed outwardly from the outer body section in such manner as to permit the wire spring to be shifted diametrically by simple depression of the bowed portion. The two spring arms are offset to form sloping shoulders for cooperation with cam portions of the outer body section, the two cam portions being formed by ends of the pair of circumferentially extending slots. To release the interlocking telescoped body sections from each other it is merely necessary to depress the bowed portion of the spring to cause the spring arms to spread to their release positions by cam action.

The features and advantages of the invention may be understood from the following detailed description and the accompanying drawings.

BRIEF DESCRIPTION OF THE DRAWINGS

In the drawings, which are to be regarded as merely illustrative:

FIG. 1 is an elevational view of a selected embodiment of the hydraulic control mechanism wherein a push-button control unit is connected to a remote operating unit by means of a flexible hydraulic line;

FIG. 2 is an elevational view of the push-button control unit with the outer telescoping walls thereof shown in section;

FIG. 3 is a sectional view of the push-button control unit;

FIG. 4 is a view partly in cross section and partly in elevation indicating the procedure of assembling the push-button plunger for forceably inserting the plunger through a port of the control unit;

FIG. 5 is a transverse section taken as indicated by the line 5—5 of FIG. 4, the view showing the latch spring in its locking position;

FIG. 6 is a sectional view similar to FIG. 5 showing how depression of the bowed portion of the spring causes the two arms of the spring to release by cam action; and FIG. 7 is a sectional view partly in side elevation illustrating the step of assemblying the control unit to the panel.

DESCRIPTION OF THE SELECTED EMBODIMENT OF THE INVENTION

FIG. 1 shows the selected embodiment of the invention in which a push-button control unit 10 is connected by a flexible hydraulic hose 12 to a remote operating unit 14. As shown in FIG. 3, a push-button 15 is mounted on a plunger 16 having a nose 18 that is largely enveloped by a diaphragn 20 of flexible sheet material. The diaphragm spans the interior of a cylindrical chamber 22 and divides the interior of the chamber into a first compartment on the outer side of the diaphragm and a second compartment which is on the inner side of the diaphragm in contact with a body 26 of hydraulic fluid which extends from the second compartment through the hydraulic hose 12 to the remote operating unit.

As disclosed in the above mentioned Porter patent, the operating unit 14 has a compartment (not shown) that is filled with the hydraulic fluid and the compartment has a diaphragm (not shown) similar to the diaphragm 20, which diaphragm is normally retracted by Belleville springs (not shown) and may be flexed in opposition to the Belleville springs to actuate an operating push rod that is operatively connected to the normally closed locking valve of the hydraulic lock for the tiltable back rest. FIG. 3 shows the normal retracted position of the push-button and the diaphragm 20. When the push-button is depressed to advance the plunger 16, the diaphragm 20 is flexed as indicated in dotted lines to cause displacement of the hydraulic fluid and corresponding advance of the diaphragm in the remote operating unit 14.

As may be seen in FIG. 3 the cylindrical chamber 22 is made in two parts which abut the edge to grip the periphery of the diaphragm 20 in a fluid tight manner. One of the two parts of the cylindrical chamber has a sloping circumferential shoulder 27 and the other of the two parts has a skirt 28 which is swaged into engagement with the tapered shoulder for permanent joining of the two parts.

Once the diaphragm 20 is installed in the cylindrical chamber 22 and the control unit 10 is connected to the operating unit 14 by the hose 12, a precisely predetermined quantity of hydraulic fluid is introduced into the control mechanism through a fill port 29. The fill port is then closed by a screw 30 that is provided with a suitable sealing gasket 31.

The next step in the fabrication of the control unit is to install the push-button plunger 16 for sliding action in an axial port 32 of the cylindrical chamber 22. It may be seen in FIG. 3 that when the push-button plunger 16 is held at its normal retracted position by the retracted diaphragm 20, an elastomeric O-ring 33 mounted in a circumferential groove 34 of the push-button shank serves as a limiting stop means in abutment with the inner rim of the port 32, the inner rim forming an abrupt annular stop shoulder 35. It will also be noted, as best shown in FIG. 4, that the outer rim of the port 32 is chamfered to form a tapered entrance 36.

After the diaphragm 20 is installed and the hydraulic liquid is introduced into the control mechanism, the next step is to assemble the push-button plunger in the cylindrical chamber. A feature of the invention is that with the O-ring 32 mounted on the push-button plunger, the step of installing the push-button plunger consists simply of forcibly inserting the plunger through the port 32. The O-ring must, of course, be distorted to pass through the port 32 and the flared entrance 36 facilitates the temporary distortion. Once the O-ring 33 passes beyond the port 32 the O-ring expands to its normal unrestrained diameter for cooperation with the annular stop shoulder 35.

In the construction shown, a cup-shaped member 37 has an annular bottom wall 38 which embraces the cylindrical chamber 22 and is secured thereto by a pair of snap rings 40 which seat in corresponding outer circumferential grooves of the cylindrical chamber. A cylindrical member 42 having a radial end flange 44 cooperates with the cup-shaped member and is dimensioned to telescope snugly into the cup-shaped member. Thus the body of the control unit 10 is made in two telescoping sections, the outer of the two telescoping body sections being the cup-shaped member 37 and the inner of the two telescoping body sections being the cylindrical member 42.

As shown in FIG. 3, the control unit 10 is intended to be mounted in a circular opening 45 of a control panel 46 on an arm of an airplane seat. When the control unit 10 is installed, what may be termed a first rearwardly facing peripheral shoulder 48 formed by the end flange 44 cooperates with the forward face of the panel and a second forwardly facing peripheral shoulder 50 formed by the rim of the cup-shaped member 37 cooperates with the rearward face of the panel to hold the control unit in its installed position.

In the present embodiment of the invention additional means is associated with one of the two peripheral shoulders 48 and 50 to effect pressurized engagement of the panel by the control unit. For this purpose, a marcel spring 52 embraces the cylindrical member 42 adjacent the inner face of the panel and a washer or back-up ring 54 backs against the scond peripheral shoulder 50 to maintain the marcel spring under axial compression against the inner face of the panel. Incorporation of the marcel spring makes the installed control unit rigid relative to the panel 46 and keeps the end flange 44 snug against the front face of the panel.

An important feature of the invention is the provision of releasable means to interlock the two telescoping body sections together with a snap action in response to telescoping movement of the two body sections relative to each other. For this purpose a wire spring, generally designated 55, is formed with two arms 56 that straddle the cup-shaped member 37 for releasable engagement with a third forwardly facing peripheral shoulder 58 of the cylindrical member 42. As best shown in FIG. 7 the forwardly facing shoulder 58 is a side wall of an outer circumferential groove 60 in the cylindrical member 42.

The two arms 56 of the wire spring 55 extend into two corresponding circumferntially directed slots 62 in the cup-shaped member 37. As shown in FIG. 5, the two arms 56 are connected by a centerally outwardly bowed portion 64 of the wire spring and it is apparent that the wire spring may be shifted diametrically from the position shown in FIG. 5 to the position shown in FIG. 6 by depression of the bowed portion 64. Preferably retention of the wire spring 55 on the control unit at the normal position of the wire spring is insured by providing a peripheral recess in the cup-shaped member 37 for engagement by the ends of the two wire arms 55. As best shown in FIG. 5 the peripheral recess may be in the form of a radial opening 65 and the ends of the two spring arms 56 may be formed with inwardly directed hook portions 66 to enter the radial opening.

When the two telescoping body sections are separated the inwardly biased spring arms 56 protrude into the interior of the cup-shaped member 34 as shown in FIG. 7. Also as shown in FIG. 7 the leading end of the cylindrical member 42 is chamfered to form a conical nose 68 which is shaped and dimensioned to cam the two spring arms apart. Thus when the two body sections are moved together into telescoping relationship, the spring arms 56 first move outward to release positions and then subsequently snap into engagement with the groove 60 of the inner body section 42.

The diametrical shift of the wire spring 55 by depression of the outwardly bowed portion 64 causes the two spring arms 56 to spread apart to their release positions. For this purpose the two spring arms 56 are offset to form inner sloping shoulders 70, the two shoulders being shaped and dimensioned for cam action against cooperative end shoulders 72 of the corresponding two slots 62.

The procedure for mounting the control unit in the panel 46 may be readily understood from the foregoing description and by reference to FIG. 7. With the cylindrical member 42 separated from the cup-shaped member 37 and with the marcel spring 52 and the back-up ring 54 separated, the first step in the procedure of installing the control unit in the panel 46 is simply to back the cup-shaped member 37 into the opening 45 of the panel from the front side of the panel. The technician who is carrying out the installation procedure then reaches behind the panel 46 to telescope the marcel spring 52 and the back-up ring 54 onto the cylindrical member 42 from the rear side of the panel. The next and final step consists simply of placing the cup-shaped member 37 rearwardly of the panel as indicated in FIG. 7 and then forcing the two body sections together axially until the two arms 56 of the wire spring 55 snap into engagement with the circumferential groove 60 of the cylindrical member 42.

Our description in specific detail of the selected embodiment of the invention will suggest various changes, substitutions and other departures from my disclosure.

We claim:

1. Control means for use in a remote control system of the character described wherein control force applied to the control means is transmitted to a remote operating means for actuation thereof by displacement of a body of hydraulic fluid that extends through a conduit from the control means to the operating means, said control means comprising:
   a hollow body;
   a movable wall dividing the interior of said hollow body into a first chamber containing a portion of said hydraulic fluid and a second chamber,
   the hollow body having a port in said second chamber;
   an operating plunger slidingly extending through said port to displace said movable wall; and
   elastomeric means extending around the circumference of said plunger and having an unrestrained outside diameter greater than the inside diameter of said port, said elastomeric means being contractable by elastic deformation to pass through said port where, in assembling the control means, the plunger with the elastomeric means thereon may be forcibly inserted through said port until the elastromeric means clears the port and expands to cooperate with the port to resist withdrawal of the plunger from the second chamber.

2. A combination as set forth in claim 1 in which said elastomeric means is in the form of a ring seated in a circumferential groove of the plunger.

3. A combination as set forth in claim 1 in which the body of hydraulic fluid acting on the plunger normally biases the plunger to a retracted position and in which said elastomeric means is positioned on the plunger to serve as a stop to abut an annular portion of said port when the plunger is in its retracted position.

4. A combination as set forth in claim 1 in which said first chamber has a port for the introduction of hydraulic fluid into said system and a closure releasably seals the port.

5. An improvement as set forth in claim 1 in which said movable wall is a flexible diaphragm and in which the body of hydraulic fluid holds said diaphragm in position enveloping the leading end of the plunger at the normal retracted position of the plunger.

6. In a remote control system of the character described wherein control means incorporates a control chamber having a movable control wall and the control means is operatively connected to a movable operating wall of a remote operating means by means of a body of hydraulic fluid extending through a conduit from the control chamber to the operating means, an improvement to facilitate installation of the control means in an opening in a control panel, comprising:

said control means having body dimensioned for insertion into said panel opening, the body comprising two sections telescoped together, the inner of said body sections having a first rearwardly facing peripheral shoulder to abut one face of the panel, the outer of said body sections having a second forwardly facing peripheral shoulder to abut the other face of the panel to permit the two shoulders to hold the control means on the panel, the inner of the two body sections having a third forwardly facing peripheral shoulder; and spring means on the outer body section normally engaging said third forwardly facing peripheral shoulder of the inner body section to keep the first and second shoulders in cooperating relation with the panel whereby the spring may be displaced inwardly diametrically of the outer body section by manually displacing said bowed portion of the spring radially inwardly, said two arms of the spring and the corresponding portions of the outer body section being shaped and dimensioned for cam action by the outer body section on the two arms of the spring to spread the two arms out of engagement with said third peripheral shoulder in response to diametrical displacement of the spring by manual pressure on said bowed out portion, whereby, with the two body sections separated from each other, one of the two body sections may be moved into its assembled position from one side of the panel and then the other body section may be moved into its assembled position from the other side of the panel with consequent relative telescoping movement of the two body sections until the two spring arms engage said third peripheral shoulder to lock the two sections together at their assembled positions.

7. In a remote control system of the character described wherein control means incrporates a control chamber having a movable control wall and the control means is operatively connected to a movable operating wall of a remote operating means by means of a body of hydraulic fluid extending through a conduit from the control chamber to the operating means, an improvement to facilitate installation of the control means in an opening in a control panel, comprising:

said control means having a body dimensioned for insertion into said panel opening, the body comprising two sections telescoped together, the inner of said body sections having a first rearwardly facing peripheral shoulder to abut one face of the panel, the outer said body sections having a second forwardly facing peripheral shoulder to abut the other face of the panel to permit the two shoulders to hold the control means on the panel, the inner of the two body sections having a third forwardly facing peripheral shoulder, the outer of the body sections having a pair of circumferentially spaced circumferentially extending slots; and a spring embracing said outer body section, said spring being split to form two arms, each of the arms extending through one of said slots and normally engaging said third forwardly facing peripheral shoulder of the inner body section to keep the first and second shoulders in cooperating relation with the panel whereby the spring may be displaced inwardly diametrically of the outer body section by manually displacing said bowed portion of the spring radially inwardly, said two arms of the spring and the corresponding portions of the outer body section being shaped and dimensioned for cam action by the outer body section on the two arms of the spring to spread the two arms out of engagement with said third peripheral shoulder in response to diametrical displacement of the spring by manual pressure on said bowed out portion.

whereby, with the two body sections separated from each other, one of the two body sections may be moved into its assembled position from one side of the panel and then the other body section may be moved into its assembled position from the other side of the panel with consequent relative telescoping movement of the two body sections until the two spring arms engage said third peripheral shoulder to lock the two sections together at their assembled positions.

8. An improvement as set forth in claim 7 in which said outer body section has a peripheral recess positioned diametrically opposite from said bowed portion of the spring;

and in which the ends of said arms are turned into said recess.

9. An improvement as set forth in claim 7 in which said spring is a wire spring.

10. An improvement as set forth in claim 7 in which each of said arms of the spring has an offset forming a sloping shoulder for cam action on an end of the corresponding peripheral slot to spread the two arms.

11. An improvement as set forth in claim 7 which includes an annular axially compressible spring embracing the outer body section to act between one of said radial flanges and the corresponding face of the panel to keep the two radial flanges in pressure engagement with the panel.

12. An improvement as set forth in claim 11 in which said annular spring is interposed between the panel and the radial flange of the outer of the two telescoping body sections.

13. An improvement as set forth in claim 7 in which said spring and the inner end of said inner body section are shaped and dimensioned for cam action to split the arms of the spring apart in response to the telescoping of the two body sections together.

References Cited

UNITED STATES PATENTS

| 994,493 | 6/1911 | Altemus | 200—77 |
| 2,113,535 | 4/1938 | Cuno et al. | 248—27 |
| 2,689,700 | 9/1954 | Drury | 248—27 |
| 2,777,911 | 1/1957 | Cox, Jr. | 200—77 |

MARTIN P. SCHWADRON, Primary Examiner

R. BUNEVICH, Assistant Examiner

U.S. Cl. X.R.

74—527; 200—77, 86; 248—27